United States Patent
Bindschedler-Galli et al.

(10) Patent No.: US 6,194,049 B1
(45) Date of Patent: *Feb. 27, 2001

(54) POLYMERIC WATERPROOFING MEMBRANE

(75) Inventors: Urs Alexander Bindschedler-Galli, Sarnen (CH); Lucas Evaristus van de Walle, BC Sittard (NL)

(73) Assignee: Sarna Patent-und Lizenz AG, Heerlen (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/720,629

(22) Filed: Oct. 2, 1996

(30) Foreign Application Priority Data

Oct. 2, 1995 (CH) .................................. 2818/95
Jul. 20, 1996 (CH) .................................. 1810/96

(51) Int. Cl.[7] ............................ B32B 7/04; B32B 27/32
(52) U.S. Cl. ............................ 428/76; 428/78; 428/213; 428/423.1; 428/516; 428/515; 428/157; 52/409; 405/52; 156/244.19; 156/244.21
(58) Field of Search ................................ 428/910, 192, 428/157, 500, 515, 516, 213, 78, 76, 194, 68, 423.1; 52/408, 409; 405/52; 156/244.19, 244.21

(56) References Cited

U.S. PATENT DOCUMENTS

| | | | |
|---|---|---|---|
| 3,547,772 | * 12/1970 | Schneblen et al. | 428/520 |
| 3,673,050 | * 6/1972 | Newman, Jr. et al. | 428/214 |
| 4,557,780 | * 12/1985 | Newsome et al. | 156/244.11 |
| 4,827,686 | * 5/1989 | Stamper et al. | 52/408 |
| 4,846,822 | * 7/1989 | Foxman | 604/370 |
| 5,204,148 | * 4/1993 | Alexander et al. | 428/40 |
| 5,221,570 | 6/1993 | Gokcen et al. | 428/215 |
| 5,358,791 | * 10/1994 | Johnson | 206/63.2 |
| 5,422,179 | * 6/1995 | Dietshi et al. | 428/349 |
| 5,482,771 | * 1/1996 | Shah | 428/349 |
| 5,759,924 | * 6/1998 | Sahlin | 442/60 |
| 5,854,304 | * 12/1998 | Garcia et al. | 523/124 |

FOREIGN PATENT DOCUMENTS

| | | |
|---|---|---|
| 8909045 | 7/1989 | (DE) . |
| 3929682 | 3/1991 | (DE) . |
| 199099 | 10/1986 | (EP) . |
| 0 199 099 | * 10/1986 | (EP) . |
| 284714 | 10/1988 | (EP) . |
| 428851 | 5/1991 | (EP) . |
| 2140346 | 11/1984 | (GB) . |

* cited by examiner

Primary Examiner—Paul Thibodeau
Assistant Examiner—D. Lawrence Tarazano
(74) Attorney, Agent, or Firm—Burns, Doane, Swecker & Mathis, LLP

(57) ABSTRACT

A polymeric waterproofing membrane is provided which has an improved biaxial elongation compared with conventional polymeric waterproofing membranes. The membrane is a composite of an upper layer and a lower layer as well as an in between situated barrier layer, wherein the barrier layer comprises at least one organic polymeric material and the upper layer and the lower layer comprise at least one organic polymeric material which has better mechanical characteristics in comparison to the organic polymeric material used in the barrier layer. The upper layer and the lower layer contain the same or different materials. The organic polymeric material for the barrier layer is not damaged upon biaxial elongation of the polymeric waterproofing membrane, and biaxial elongation of the polymeric waterproofing membrane does not result in separation of the layers. The polymeric waterproofing membranes may be used for the sealing, covering, coating, and isolation of deposits and land-fills which serve for the reception of liquid and solid wastes, for the protection of waters and underground water as well as grounds and soils, and for the protection of buildings and constructions which are in contact with contaminated mediums.

25 Claims, No Drawings

POLYMERIC WATERPROOFING MEMBRANE

FIELD OF THE INVENTION

The present invention is directed to a polymeric waterproofing membrane, having a considerably improved biaxial elongation, compared with conventional polymeric waterproofing membranes, and comprising a composite of an upper layer and a lower layer as well as an in between situated barrier layer.

The present invention is also directed to processes for the preparation of this polymeric waterproofing membrane as well as to its use.

BACKGROUND OF THE INVENTION

Polymeric waterproofing membranes on the basis of ethylene-homopolymers and/or ethylene-copolymers as well as propylene-homopolymers and/or propylene-copolymers are known. See for example the products of the firm National Seal Company in Aurora, Ill 60504, USA and products of the firm Montell Polyolefins in I-44100 Ferrara, Italy.

Polymeric waterproofing membranes made of PE-HD (Polyethylene-high density) with a barrier layer of exclusively rolled aluminum foils (from about 50 to about 250 micrometer thick) are known.

Already at a small, unimportant biaxial, elongation this aluminum-barrier layer tears, and the barrier function is reduced considerably.

In the in DE OS 35 14 383, corresponding to EP 0 199 099 A2, described polymeric waterproofing membrane the inside situated layers must have—citation—at least approximative the same mechanical characteristics as those of the outside situated polymeric membranes—end of citation -.

The in DE OS 35 14 383 mentioned—citation—high elongation—end of citation—concerns a monoaxial elongation, which has nothing to do with a biaxial elongation.

For the coating of deposits and land-fills are used mainly waterproofing membranes made of PE-HD.

Polymeric membranes of this kind have a small biaxial elongation and, due to their small flexibility, they adapt themselves correspondingly bad to the sealing carrier.

When the maximum value of the biaxial elongation is trespassed, then the polymeric membrane tears. This results therein that detrimental compounds may come through the originated leakages into the water, into the ground or into the atmosphere.

Conventional waterproofing membranes on the basis of polyethylene should practically not be used for the sealing of deposits and land-fills, due to their high permeation rates, such as for example for halogenated hydrocarbons, such as dichloro benzene.

SUMMARY OF THE INVENTION

It is an object of the present invention to overcome the above mentioned drawbacks.

It is a further object of the present invention to provide a polymeric waterproofing membrane, having a the diffusion of detrimental compounds, such as aromatic and halogenated hydrocarbons, for example dichloro benzene, dichloro methan, hindering barrier layer made of organic material.

This polymeric waterproofing membrane shall have a high flexibility, combined with a high biaxial elongation and a high relaxation behaviour.

There shall be provided especially a new, in the use temperature range from −40° C. to +70° C. flexible product having a thickness (strength) from 1.5 mm to 5 mm, which contains no plasticizing agents or bitumen, and which has a good resistance to atmospheric corrosion, as well as a good and simple workability, especially welding (heat-sealing) with conventional welding (heat-sealing) technics and welding (heat-sealing) devices (double welding tool weld, extrusion weld, manual hot gas welding, by machine hot gas welding), as well as a good chemical, biological resistance and a resistance against bitumen.

In addition it shall not contain heavy metal stabilizers.

The new product shall be composed, prepared and be correspondingly workable in such a way for the at times application, that therefrom, compared with the prior art, a very good price/result ratio results.

For the use in underwater sealings, for example underwater deposits, the density of this polymeric waterproofing membrane shall be adjustable for an easier laying.

At this application the density shall preferably be from 1.2 $g/cm^3$ to 1.4 $g/cm^3$.

In addition, there shall be provided simple and cheap processes for the preparation of this new product.

The foregoing, as well as other objects, advantages, features and aspects of the invention will become more apparent by reference to the following detailed description and the appended claims.

DETAILED DESCRIPTION OF THE INVENTION

The polymeric waterproofing membrane according to the present invention have an improved biaxial elongation compared with conventional polymeric waterproofing membranes, and comprise a composite of a first layer, a second layer, and a barrier layer between the first and second layers. The barrier layer comprises at least one organic polymeric material; the first layer and the second layer comprise at least one organic polymeric material which has better mechanical characteristics in comparison to the organic polymeric material used in the barrier layer; and the first layer and the second layer comprise the same or different materials.

The polymeric waterproofing membrane according to the invention may include an adhesive promoter between the first layer and the barrier layer, as well as an adhesion promoter between the second layer and the barrier layer, wherein the adhesion promoter between the first layer and barrier layer is selected independently from the adhesion promoter between the second layer and the barrier layer. The adhesion promoter includes adhesive polyolefins, such as an adhesive polyolefin modified with maleic anhydride, adhesive acetate resins, copolymers of vinylacetate, adhesive polyurethane, adhesive acrylate resins, and copolymers of acrylic esters.

The organic polymeric material of the barrier layer includes polyamides, polyvinyl halides, polyvinylidene halides, polyethylene terephthalates optionally vapor-blasted with metallic aluminum, and ethylene vinyl alcohols and their copolymers. Preferred organic polymeric materials of the barrier layer are polyvinyl fluoride and polyvinylidene chloride.

The organic polymeric material of the first layer and the second layer includes polyurethanes, ethylene-homopolymers, ethylene-copolymers, propylene-homopolymers, and propylene-copolymers. Preferred organic polymeric materials of the first and second layers are an ethylene-homopolymer or ethylene-copolymer with a density of 0.920 g/cm$^3$ or less, a propylene-homopolymer or propylene-copolymer with a density of 0.920 g/cm$^3$ or less, and an ethylene-copolymer with a density ranging from 0.900 g/cm$^3$ to 0.915 g/cm$^3$ wherein the comonomers are α-olefins with 4 to 12 carbon atoms, more preferably with 6 to 10 carbon atoms.

The first layer and second layers of the polymeric waterproofing membrane may further comprise at least one of a pigment, a stabilizer, a filler, and a processing auxiliary agent. Preferably, the pigment is titanium dioxide or lightproof color pigments, the stabilizer is a light stabilizer, antioxidant or heat stabilizer, the filler is chalk, kaolin, talcum, quartz powder or barium sulfate, and the processing auxiliary agent is a lubricant such as glycerin monostearate.

In one embodiment, the first and the second layers of the polymeric waterproofing membrane comprise from 0 to 15% by weight of pigment, from 0 to 5% by weight of stabilizer, from 0 to 40% by weight of filler, from 0 to 5% by weight of processing auxiliary agent, wherein the total of all present components is 100% by weight.

Preferably, the polymeric waterproofing membrane has a biaxial elongation of 40%, and the barrier layer is not damaged and separation of the layers does not occur.

In another embodiment, the first layer and the second layer of the polymeric waterproofing membrane each have a thickness ranging from 0.75 mm to 2.5 mm, and the barrier layer has a thickness ranging from 50 micrometers to 200 micrometers.

Preferably, the width of the first layer and the width of the second layer on each side of the polymeric waterproofing membrane is greater than the width of the barrier layer, and the first layer and the second layer are welded together thermically in the border area. More preferably, the first layer and the second layer each have a width at least 5 mm greater than the width of the barrier layer.

Preferably, the first layer, the second layer and the barrier layer of the polymeric waterproofing membrane are each a homogeneous, single layer.

In addition, the following characteristics, which are characteristic for the invention, are noted:
  permeability with regard to detrimental compounds, such as 1,2-dichloro benzene, of equal or smaller than 0.002 g/10$^4$ m$^2$/year at a concentration of detrimental compounds of 30 mg/liter H$_2$O;
  excellent flexibility;
  excellent thermic resistance to aging;
  good resistance to atmospheric corrosion (at a use of 2.5% of carbon black portion);
  good chemical and biological resistance, especially when contacted with aqueous media, bitumen substances, microorganisms;
  good flexibility at low temperatures, insignificant strengthening at low temperatures;
  good composite, good welding, heat-sealing of the layers within the polymeric waterproofing membrane;
  no ecological scruples; especially no bitumen, no plasticizing agents, no heavy metal stabilizers, such as Pb, Cd, no smoke- and/or odor formation during the preparation and the processing, recycable, no scruples for the disposal in deposites, land-fills or by combustions;
  good workability, especially good welding (heat-sealing) for the described applications with conventional welding (heat-sealing) technics and welding (heat-sealing) devices (hot-air, welding tool, and so on).

The quality of the welding linkages between the single membranes to larger surface sealings corresponds to the standard DVS-Norm 2203, parts 1–5 ("Deutscher Verband fuer Schweisstechnik e.V.").

Because the inventive polymeric waterproofing membranes are flexible, they adapt themselves better to the respective underground.

Therefrom results a large surface, intensive pressure composite between the inventive polymeric waterproofing membranes and the underground.

The advantage of a large surface, intensive pressure composite consists therein, that in the inventive polymeric waterproofing membrane are present only small, if any, stresses.

It is possible, to build up the barrier layer in a multilayer manner. Thereby the corresponding barrier layers are bound to each other with a suitable adhesion promoter.

In the following part are mentioned further possible processes for the preparation of the inventive polymeric waterproofing membranes:
  coextrusion processes (blowing or sheeting-die)
  combination of different process technics.

On a smelt roller calender is applied onto the barrier layer, with or without adhesion promoter, either simultaneously on-line or successively off-line the upper layer and the lower layer.

The barrier layer, with or without adhesion promoter, is laminated on a lamination plant with the upper layer and with the lower layer.

Thereby the upper layer and the lower layer are prepared either in a film calender or in a monoextrusion plant.

In one embodiment, preparing the inventive polymeric waterproofing membrane comprises a first step in which the components for the first layer are plastisized in a first extruder and are mixed homogeneously and are extruded through a sheeting die, then the so obtained first sheet-like mass is welded together thermically under the influence of pressure with the incoming barrier layer from one side in a first opening, also named gap, between two calender rolls, whereby said sheet-like mass forms a bank, also named smelt-bulb. In the same operation on-line in a second step the components for the second layer are plasticized in a second extruder and are mixed homogeneously and are extruded through a sheeting-die, then the so obtained second sheet-like mass is welded together thermically under the influence of pressure with the incoming membrane obtained from the first step from the other side in a second opening between two calender rolls, whereby said sheet-like mass forms a bank. Optionally, the so obtained polymeric waterproofing membrane is cooled, and/or stamped, and/or backed, and/or cut, and/or wound.

In another embodiment, preparing the inventive polymeric waterproofing membrane comprises a first step in which the components for the first layer are plasticized in an extruder and are mixed homogeneously and are extruded through a sheeting die, then the so obtained first sheet-like mass is welded together thermically under the influence of pressure with the incoming barrier layer from one side in an opening, also named gap, between two calender rolls, whereby said sheet-like mass forms a bank, also named smelt-bulb, and then cooling and winding the so obtained product. In a second step off-line the components for the second layer are plasticized in an extruder and are mixed homogeneously and are extruded through a sheeting-die, then the so obtained second sheet-like mass is welded together thermically under the influence of pressure with the incoming membrane obtained from the first step from the other side in an opening between two calender rolls, whereby said sheet-like mass forms a bank. Optionally, the so obtained polymeric waterproofing membrane is cooled, and/or stamped, and/or backed, and/or cut, and/or wound.

Uses of the inventive polymeric waterproofing membranes include sealing, covering, coating, isolation of deposits and land-fills, which serve for the reception of liquid and solid wastes; protecting waters and underground water as well as grounds and soils, especially under and/or on traffic supports, such as highways, airports, railway installations and industrial plants, such as storage tank installations, transshipment areas, production areas and store houses; and protecting buildings and constructions which are in contact with contaminated mediums, especially contaminated grounds and soils or contaminated waters.

The inventive polymeric waterproofing membranes have excellent basic characteristics, which are the result of the composition of the single components and of the preparation process, as they are described in the following examples.

The following examples illustrate the present invention.

EXAMPLE 1

For the preparation of a polymeric waterproofing membrane with a total thickness of 2.5 mm, whereby the upper layer and the lower layer are made from the same materials, the following components were brought into a synchronized double screw extruder:

| Components | % by weight |
|---|---|
| VLDPE (Very low density polyethylene) with a density of 0.910 g/cm$^3$ | 62.6 |
| VLDPE with a density of 0.914 g/cm | 31.3 |
| Compound, consisting of 40% by weight VLDPE (d = 0.910 g/cm$^3$) 20% by weight VLDPE (d = 0.914 g/cm$^3$) 40% by weight carbon black (as pigment and light stabilizer) with a density of 1.140 g/cm$^3$ | 6.0 |
| heat stabilizer | 0.1. |

In this double screw extruder these components were plasticized, mixed homogeneously and extruded through a sheeting die (working width 1 m). The material dosage into the extruder was realized by a differential dosage balance.

The temperature of the sheet-like mass, coming out of the sheeting die, was 220° C. to 230° C. The output was 130 kg per hour.

This sheet-like mass was introduced from the top into the lower gap (opening) of a calender with 3 calender rolls. Simultaneously the barrier layer was introduced from below over the lower calender roll with a rate of 1.6 m/minute.

The barrier layer was a prefabricated, 70 micrometer thick foil of PVDC (polyvinylidene chloride), which was coated on both sides (each 25 micrometer) with EVA (ethylene-vinylacetat-copolymer) as adhesion promoter.

In order to obtain an optimum of adhesion between the first layer (upper layer) to be formed and the adhesion promoter layer, it was worked with a bank, also named smelt-bulb or kneaded stock, in order to obtain the necessary contact pressure.

The temperature of the lower calender roll was from 60° C. to 90° C., this one of the calender roll in the middle was from 40° C. to 60° C. Through the gap between the lower calender roll and the calender roll in the middle, the thickness of the membrane was adjusted to 1.2 mm. Then the membrane was cooled to room temperature over cooling calender rolls and wound.

In a second step the second layer (lower layer) was welded (heat-sealed) completely with the membrane, prepared in the first step. The plasticizing, homogenizing and extruding was carried out in the same manner as described above.

The sheet-like mass, coming out of the sheeting die, was introduced in the lower gap of a calender with 3 calender rolls.

Simultaneously the membrane from the first step was introduced from below over the lower calender roll, whereby the barrier layer was turned to the side with the bank (smelt-bulb, kneaded stock).

The temperature of the lower calender roll was from 30° C. to 50° C., this one of the calender roll in the middle was from 50° C. to 80° C. Through the gap between the lower calender roll and the calender roll in the middle the thickness of the membrane was adjusted to 2.5 mm.

Then this membrane was cooled to room temperature over cooling calender rolls, the edges were cut, and the membrane was wound.

The so obtained membrane had the following characteristics:

| Test | Standard | Unit | Value |
|---|---|---|---|
| Thickness of the membrane | DIN 53370 | mm | 2.5 |
| Density of the membrane | — | g/cm$^3$ | 0.93 |
| Tensile strength | | | |
| lengthwise | DIN 53455 | N/mm$^2$ | 24 |
| crosswise | | | 24 |
| Elongation at break | | | |
| lengthwise | DIN 53455 | % | 750 |
| crosswise | | | 750 |
| Yield stress | | | |
| lengthwise | DIN 53455 | N/mm$^2$ | 7 |
| crosswise | | | 7 |
| Elongation at yield stress | | | |
| lengthwise | DIN 53455 | % | 16 |
| crosswise | | | 16 |
| Fold bending in the cold | SIA 280/2 | ° C. | <−50 |
| Change of shape in the heat | | | |
| lengthwise | SIA 280/3 | % | <1 |
| crosswise | | | <1 |
| Thermal aging (70 days, 70° C.) | SIA 280/7 | | |
| - mass change | | % | −0.05 |
| Biaxial elongation (diameter of the pressure pot: 180 mm, test temperature: 23° C.) | — | % | 180 |
| Permeability with regard to 1,2-dichloro benzene (DCB) (c = 30 mg / liter H$_2$O) | — | g/10$^4$m$^2$/year | 0.002 |
| Resistance against continued tearing | DIN 53363 | N/mm | 206 |
| Flexibility (measurement of torsion) | | | |

-continued

| Test | Standard | Unit | Value |
|---|---|---|---|
| storage modulus G' [mPa] | | | |
| T = −20° C. | | | 285 |
| T = 0° C. | | | 150 |
| T = 23° C. | | | 76. |

EXAMPLE 2

In analogy to example 1 the following components were processed:

| Components | % by weight |
|---|---|
| VLDPE with a density of 0.910 g/cm³ | 31.3 |
| VLDPE with a density of 0.914 g/cm³ | 15.6 |
| Compound, consisting of 40% by weight VLDPE (d = 0.910 g/cm³) 20% by weight VLDPE (d = 0.914 g/cm³) 40% by weight carbon black (as pigment and light stabilizer) with a density of 1.140 g/cm³ | 3.0 |
| heat stabilizer | 0.1 |
| Compound, consisting of 20% by weight VLDPE (d = 0.910 g/cm³) 10% by weight VLDPE (d = 0.914 g/cm³) 70% by weight BaSO₄ with a density of 1.955 g/cm³ | 50. |

The so obtained membrane had the following characteristics:

| Test | Standard | Unit | Value |
|---|---|---|---|
| Thickness of the membrane | DIN 53370 | mm | 2.5 |
| Density of the membrane | — | g/cm³ | 1.246 |
| Tensile strength | | | |
| lengthwise | DIN 53455 | N/mm² | 18.7 |
| crosswise | | | 18.7 |
| Elongation at break | | | |
| lengthwise | DIN 53455 | | 500 |
| crosswise | | | 500 |
| Fold bending in the cold | SIA 280/2 | ° C. | <−50 |
| Change of shape in the heat | | | |
| lengthwise | SIA 280/3 | % | <1 |
| crosswise | | | <1 |
| Thermal aging (70 days, 70° C.) | SIA 280/7 | | |
| - mass change | | % | −0.05 |
| Biaxial elongation (diameter of the pressure pot: 180 mm, test temperature: 23° C.) | — | % | 111 |
| Flexibility (measurement of torsion) storage modulus G' [mPa] | | | |
| T = −20° C. | | | 354 |
| T = 0° C. | | | 182 |
| T = 23° C. | | | 90. |

EXAMPLE 3

In analogy to example 1 the following components were processed:

| Components | % by weight |
|---|---|
| VLDPE with a density of 0.910 g/cm³ | 31.3 |
| VLDPE with a density of 0.914 g/cm³ | 15.6 |
| Compound, consisting of 40% by weight VLDPE (d = 0.910 g/cm³) 20% by weight VLDPE (d = 0.914 g/cm³) 40% by weight carbon black (as pigment and light stabilizer) with a density of 1.140 g/cm³ | 3.0 |
| heat stabilizer | 0.1 |
| Compound, consisting of 20% by weight VLDPE (d = 0.910 g/cm³) 10% by weight VLDPE (d = 0.914 g/cm³) 70% by weight TiO² with a density of 2.030 g/cm³ | 50. |

The so obtained membrane had the following characteristics:

| Test | Standard | Unit | Value |
|---|---|---|---|
| Thickness of the membrane | DIN 53370 | mm | 2.5 |
| Density of the membrane | — | g/cm³ | 1.261 |
| Tensile strength | | | |
| lengthwise | DTN 53455 | N/mm² | 15 |
| crosswise | | | 15 |
| Elongation at break | | | |
| lengthwise | DIN 53455 | | 450 |
| crosswise | | | 500 |
| Fold bending in the cold | SIA 280/2 | ° C. | <−50 |
| Change of shape in the heat | | | |
| lengthwise | SIA 280/3 | % | <1 |
| crosswise | | | <1 |
| Thermal aging (70 days, 70° C.) | SIA 280/7 | | |
| - mass change | | % | −0.05 |
| Biaxial elongation (diameter of the pressure pot: 180 mm, test temperature: 23° C.) | — | % | 102 |
| Flexibility (measurement of torsion) storage modulus G' [mPa] | | | |
| T = −20° C. | | | 425 |
| T = 0° C. | | | 213 |
| T = 23° C. | | | 106. |

While the invention has been described above in terms of preferred embodiments, it is to be understood that variations and modifications may be used as will be appreciated by those skilled in the art.

Essentially, therefore, there are many variations and modifications to the above preferred embodiments which will be readily evident to those skilled in the art and which are to be considered within the scope of the invention as defined by the following claims.

What is claimed is:

1. A polymeric waterproofing membrane having an improved biaxial elongation, and comprising a composite of a first layer, a second layer, and a barrier layer between the first and second layers, wherein the barrier layer comprises at least one organic polymeric material; the first layer and the second layer comprise at least one organic polymeric material; said first layer and said second layer comprise the same or different materials; wherein the first layer and the second layer each have a thickness ranging from 0.75 mm to 2.5 mm, and the barrier layer has a thickness ranging from 50 micrometers to 200 micrometers; wherein the organic polymeric material of the first layer and the second layer is selected from the group consisting of polyurethanes, propylene-homopolymers and propylene-copolymers with a density of 0.920 g/cm$^3$ or less, and ethylene-homopolymers and ethylene-copolymers with a density of 0.920 g/cm$^3$ or less wherein the comonomers are α-olefins with 4 to 12 carbon atoms; and wherein at a biaxial elongtation of 102% at 23° C. and a prssure pot diameter of 180 mm the barrier layer is not damaged and separation of the layers does not occur.

2. Polymeric waterproofing membrane according to claim 1, wherein an adhesive promoter is present between the first layer and the barrier layer, and an adhesion promoter is present between the second layer and the barrier layer, and wherein the adhesion promoter between the first layer and barrier layer is selected independently from the adhesion promoter between the second layer and the barrier layer.

3. Polymeric waterproofing membrane according to claim 2, wherein the adhesion promoter is selected from the group consisting of adhesive polyolefins, adhesive acetate resins, copolymers of vinylacetate, adhesive polyurethanes, adhesive acrylate resins, and copolymers of acrylic esters.

4. Polymeric waterproofing membrane according to claim 2, wherein the adhesion promoter is an adhesive polyolefin modified with maleic anhydride.

5. Polymeric waterproofing membrane according to claim 1, wherein the organic polymeric material of the barrier layer is selected from the group consisting of polyamides, polyvinyl halides, polyvinylidene halides, polyethylene terephthalates optionally vapor-blasted with metallic aluminum, and ethylene vinyl alcohols and their copolymers.

6. Polymeric waterproofing membrane according to claim 5, wherein the organic polymeric material of the barrier layer is polyvinyl fluoride or polyvinylidene chloride.

7. Polymeric waterproofing membrane according to claim 1, wherein the organic polymeric material of the first layer and the second layer is an ethylene-copolymer with a density ranging from 0.900 g/cm$^3$ to 0.915 g/cm$^3$.

8. Polymeric waterproofing membrane according to claim 7, wherein the comonomers are α-olefins with 6 to 10 carbon atoms.

9. Polymeric waterproofing membrane according to claim 1, wherein at least one of the first layer and second layer further comprises at least one of a pigment, a stabilizer, a filler, and a processing auxiliary agent.

10. Polymeric waterproofing membrane according to claim 9, wherein said pigment comprises titanium dioxide or lightproof color pigments.

11. Polymeric waterproofing membrane according to claim 9, wherein said stabilizer comprises light stabilizers, antioxidants or heat stabilizers.

12. Polymeric waterproofing membrane according to claim 9, wherein said filler comprises chalk, kaolin, talcum, quartz powder or barium sulfate.

13. Polymeric waterproofing membrane according to claim 9, wherein said processing auxiliary agent comprises a lubricant.

14. Polymeric waterproofing membrane according to claim 13, wherein said lubricant is glycerin monostearate.

15. Polymeric waterproofing membrane according to claim 1, wherein at least one of the first layer and the second layer comprises up to 15% by weight of pigment, up to 5% by weight of stabilizer, up to 40% by weight of filler, up to 5% by weight of processing auxiliary agent, wherein the total of all present components is 100% by weight.

16. Polymeric waterproofing membrane according to claim 1, wherein the width of the first layer and the width of the second layer on each side of the polymeric waterproofing membrane is greater than the width of the barrier layer, and the first layer and the second layer are welded together thermically in said border area.

17. Polymeric waterproofing membrane according to claim 16, wherein the first layer and the second layer each have a width at least 5 mm greater than the width of the barrier layer.

18. Polymeric waterproofing membrane according to claim 1, wherein the first layer, the second layer and the barrier layer are each a homogeneous, single layer.

19. A process for the preparation of the polymeric waterproofing membrane according to claim 1, wherein in a first step the components for the first layer are plasticized in a first extruder and are mixed homogeneously and are extruded through a sheeting die, then the so obtained first sheet is welded together thermically under the influence of pressure with the incoming barrier layer from one side in a first opening between two calender rolls, whereby said sheet forms a bank, and then in the same operation on-line in a second step the components for the second layer are plasticized in a second extruder and are mixed homogeneously and are extruded through a sheeting-die, then the so obtained second sheet is welded together thermically under the influence of pressure with the incoming membrane obtained from the first step from the other side in a second opening between two calendar rolls, whereby said sheet forms a bank; and optionally the so obtained polymeric waterproofing membrane is cooled, stamped, backed, cut, or wound.

20. The process according to claim 19, wherein at least one adhesion promoter is present on one side or on both sides of the barrier layer.

21. A process for the preparation of the polymeric waterproofing membrane according to claim 1, wherein in a first step the components for the first layer are plasticized in an extruder and are mixed homogeneously and are extruded through a sheeting die, then the so obtained first sheet is welded together thermically under the influence of pressure with the incoming barrier layer from one side in an opening between two calender rolls, whereby said sheet forms a bank, and then cooling and winding the so obtained product, and then in a second step off-line the components for the second layer are plasticized in an extruder and are mixed homogeneously and are extruded through a sheeting-die, then the so obtained second sheet is welded together thermically under the influence of pressure with the incoming membrane obtained from the first step from the other side in an opening between two calendar rolls, whereby said sheet forms a bank; and optionally the so obtained polymeric waterproofing membrane is cooled, stamped, backed, cut, or wound.

22. The process according to claim 21, wherein at least one adhesion promoter is present on one side or on both sides of the barrier layer.

23. A process for sealing, covering, coating or isolating deposits and land-fills for the reception of liquid and solid wastes, comprising sealing, covering, coating or isolating deposits and land-fills with a polymeric waterproof membrane according to claim 1.

24. A process for protecting waters, underground water, grounds and soils, comprising protecting waters, underground water, grounds and soils with a polymeric waterproofing membrane according to claim 1.

25. A process for protecting buildings and constructions in contact with contaminated mediums, comprising protecting buildings and constructions in contact with contaminated mediums with a polymeric waterproofing membrane according to claim 1.

* * * * *

UNITED STATES PATENT AND TRADEMARK OFFICE
CERTIFICATE OF CORRECTION

PATENT NO.    : 6,194,049 B1
DATED         : February 27, 2001
INVENTOR(S)   : Urs A. Bindschedler-Galli et al.

It is certified that error appears in the above-identified patent and that said Letters Patent is hereby corrected as shown below:

<u>Title page,</u>
Item [73], Assignee, "Sarna Patent-und Lizenz-AG" should be -- Sarnen (CH) -- not "Heerlen (NL)."

Signed and Sealed this

Eighteenth Day of March, 2003

JAMES E. ROGAN
*Director of the United States Patent and Trademark Office*